United States Patent [19]

Hirtle et al.

[11] 4,084,235
[45] Apr. 11, 1978

[54] EMULATION APPARATUS

[75] Inventors: Allen C. Hirtle, Needham; David B. O'Keefe, Tyngsboro, both of Mass.

[73] Assignee: Honeywell Information Systems Inc., Waltham, Mass.

[21] Appl. No.: 567,981

[22] Filed: Apr. 14, 1975

[51] Int. Cl.² .................. G06F 15/20; G06F 1/00; G06F 9/16; G06F 13/00
[52] U.S. Cl. ..................................................... 364/200
[58] Field of Search .................. 340/172.5; 444/1; 364/200, 900

[56] References Cited

U.S. PATENT DOCUMENTS

| | | | |
|---|---|---|---|
| 3,300,764 | 1/1967 | Doelz | 340/172.5 |
| 3,374,466 | 3/1968 | Hanf | 340/172.5 |
| 3,440,612 | 4/1969 | Womack | 340/172.5 |
| 3,543,245 | 11/1970 | Nutter | 340/172.5 |
| 3,544,969 | 12/1970 | Rakoczi | 340/172.5 |
| 3,698,007 | 10/1972 | Malcolm | 340/172.5 |

*Primary Examiner*—James D. Thomas
*Attorney, Agent, or Firm*—Faith F. Driscoll; Nicholas Prasinos; Ronald T. Reiling

[57] ABSTRACT

A processing unit includes emulation apparatus which operates to execute instructions of a target system, one of a plurality of ways depending upon the options and features of the target system being emulated. The options, features and characteristics of the target system for which the program was originated is defined by the different bits of an option mask word stored within the emulation apparatus. Initially, upon switching to an emulation mode of operation, the emulation apparatus under microprogram control is operative to store signal representations of the option mask word in one of its storage registers. The signals from the stored option mask word are applied to different portions of the emulation apparatus for conditioning the apparatus to execute target system program instructions in accordance with the structural characteristics of the target system for which the program was originated.

26 Claims, 9 Drawing Figures

| RELATIVE LOCATION | ABBRV | CONTENTS 0–7 | 8–15 | 16–23 | 24–31 |
|---|---|---|---|---|---|
| | | CAPABILITY | PRIORITY | STATE | DEXT |
| 0* | PMW0 | XXXX0000 | XXXX0000 | XXXX0000 | 00000010 |
| 4 | PMW1 | ◄—STATUS—► | ◄—MBZ—► | ◄—MP—► | ◄—MBZ—► |
| 8 | PMW2 | TG RG | ◄———— SEG, SRA ————► | ◄—EXCEPT CLASS—► | ◄—EXCEPT TYPE—► |
| 12 | PMW3 | ◄—DETSZ—► | ◄———— POINTER TO DECOR EXTENSION TABLE, DETA ————► | | |
| 32 | ICW | TG RG | ◄———————— SEG, SRA ————————► | | |
| 52 | BR0 | TG RG | ◄———————— SEG, OFFSET ————————► | | |
| 56 | BR1 | TG RG | ◄———————— SEG, OFFSET ————————► | | |
| 60 | BR2 | TG RG | ◄———————— SEG, OFFSET (MAIN MEMORY) ————————► | | |
| 64 | BR3 | TG RG | ◄———————— SEG, OFFSET (CONTROL MEMORY) ————————► | | |
| 68 | BR4 | TG RG | ◄———————— SEG, OFFSET (I/O TABLES) ————————► | | |
| 72 | BR5 | TG RG | ◄———————— SEG, OFFSET ————————► | | |
| 76 | BR6 | TG RG | ◄———————— SEG, OFFSET ————————► | | |
| 80 | BR7 | TG RG | ◄———————— SEG, OFFSET ————————► | | |
| 84 | GR0 | ◄—INV—► | ◄—INA—► | ◄—INB—► | ◄—INC—► |
| 88 | GR1 | ◄—MBZ—► | ◄———— ADDRESS (70, BC) ————► | | |
| 92 | GR2 | ◄—CONTROL—► | ◄———— ADDRESS (67, AC) ————► | | |
| 96 | GR3 | ◄—L—► | ◄———— ADDRESS (77, SC) ————► | | |
| 100 | GR4 | ◄—IND—► | ◄—INEI—► | ◄—RHU—► | ◄—MBZ—► |
| 104 | GR5 | ◄———————— CF WORK LOCATION (CFWL2) ————————► | | | |
| 108 | GR6 | ◄———————— CF WORK LOCATION (CFWL3) ————————► | | | |
| 112 | GR7 | ◄———————— CF WORK LOCATION (CFWL6) ————————► | | | |
| 116 | GR8/IR0 | ◄—MBZ—► | ◄———— ADDRESS (64, CSR) ————► | | |
| 120 | GR9/IR1 | ◄———————— CF CONTROL WORD (CFCW) ————————► | | | |
| 124 | GR10/IR2 | ◄—MBZ—► | ◄———— ADDRESS (66, EIR) ————► | | |
| 128 | GR11/IR3 | ◄—MBZ—► | ◄———— ADDRESS (76, IIR) ————► | | |
| 132 | GR12/IR4 | ◄———————— CF WORK LOCATION (CFWL1) ————————► | | | |
| 136 | GR13/IR5 | ◄—RSU—► | ◄—BRR—► | ◄—IBR (RBM)—► | |
| 140 | GR14/IR6 | ◄———————— CF WORK LOCATION (CFWL4) ————————► | | | |
| 144 | GR15/IR7 | ◄———————— CF WORK LOCATION (CFWL5) ————————► | | | |
| 148 | SR0 | ◄———————— SCIENTIFIC ACCUMULATOR 0 ————————► | | | |
| 152 | SR0 | ◄———————— " " 0 ————————► | | | |
| 156 | SR1 | ◄———————— " " 1 ————————► | | | |
| 160 | SR1 | ◄———————— " " 1 ————————► | | | |
| 164 | SR2 | ◄———————— " " 2 ————————► | | | |
| 168 | SR2 | ◄———————— " " 2 ————————► | | | |
| 172 | SR3 | ◄———————— " " 3 ————————► | | | |
| 176 | SR3 | ◄———————— " " 3 ————————► | | | |

TG=TAG, RG=RING, MBZ= MUST BE ZERO, RSU=RESERVED FOR SOFTWARE USE, *= PCB ADDRESS

*Fig. 1b.*

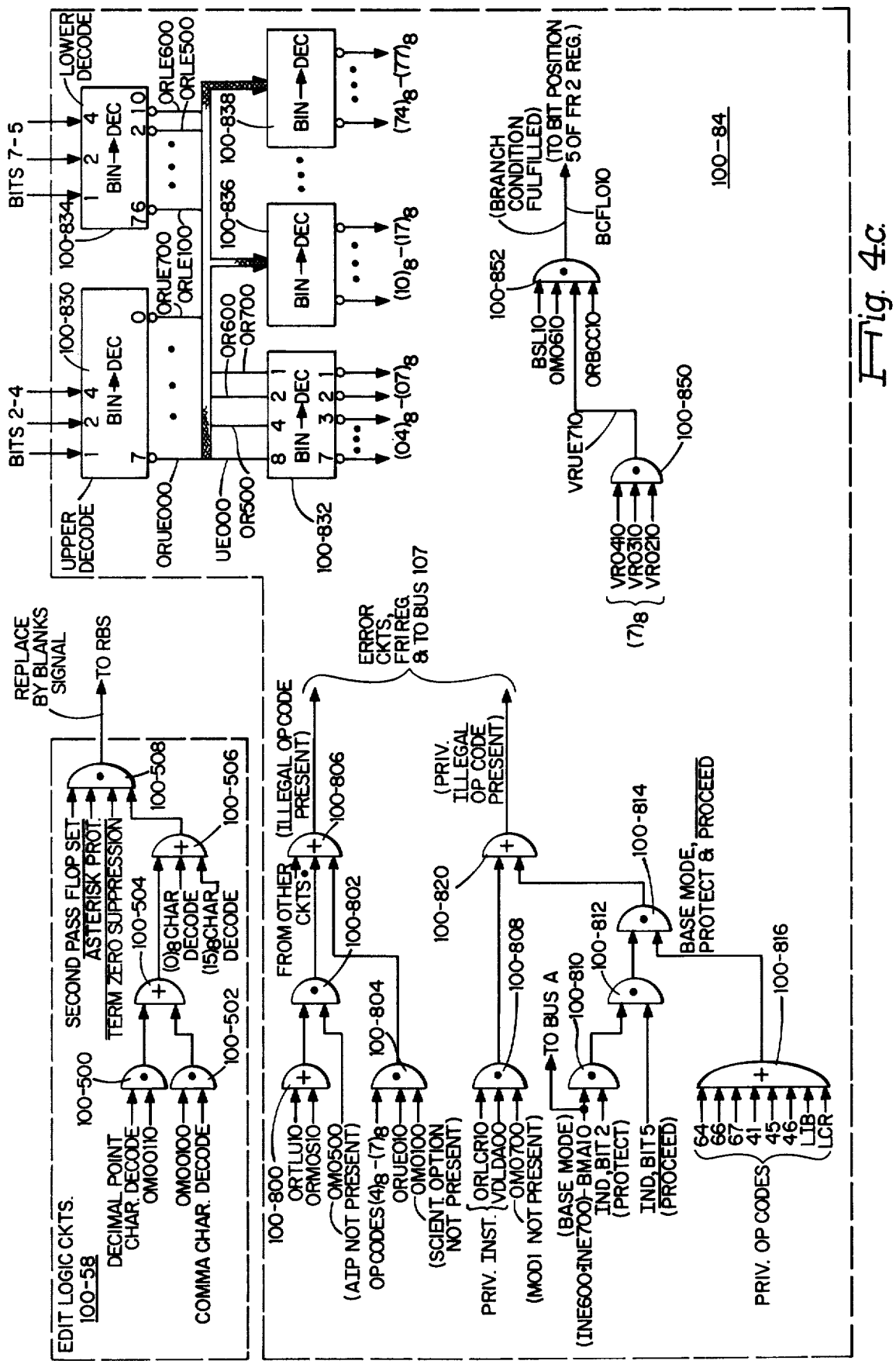
Fig. 4.c.

EMULATION APPARATUS

RELATED APPLICATIONS

The following applications are incorporated by reference.
1. "Data Processing System Having Microprogrammable Switch For Enabling The System In Either A Native or Non-Native Mode Of Operation" invented by Andre Milleret et al. filed on Dec. 2, 1974, bearing Ser. No. 528,824 and assigned to the same assignee as named herein and now U.S. Pat. No. 3,997,895 issued Dec. 14, 1976.
2. "Extended Decor Instruction" invented by Marc Appell et al. filed on Dec. 2, 1974, bearing Ser. No. 529,257 and assigned to the same assignee as named herein.

BACKGROUND OF THE INVENTION

The present invention relates to data processing systems and more particularly to a processing system which executes completely different machine programs.

In general, systems have been provided for enabling a single processor to execute two completely different types of machine programs under microprogram control. However, where the processor of a system was required to execute programs written for different models of a family of target systems, such processor without incurring considerable costs and inefficiency could not be readily modified to execute such programs for those models of the family having different characteristics. In general, in order to provide for such a capability, it was necessary either to alter the contents of the system control store with a "new firmware load" or alter the system hardware in order to execute programs for a different model. This arrangement has the disadvantage of preventing programs written for more than model to be processed concurrently.

Also, in the type of system mentioned, often times it was necessary to convert to translate portions of the program instructions of the original system in order to be able to execute the program by the new or native system processor.

Accordingly, it is a primary object of the present invention to provide a processor capable of executing programs in any one of a number of ways other than those programs written to be executed by the processor when operated in its native mode.

It is a further object of the present invention to provide a microprogrammed processor capable of emulating the operation of a plurality of target data processing systems.

SUMMARY OF THE INVENTION

These and other objects are achieved according to the present invention by means of a processing system which includes emulation apparatus. In the preferred embodiment of the present invention, the emulation unit includes hardware for performing operations for any one of a plurality of target systems to be emulated which can have different characteristics.

The emulation apparatus includes a microprogram control unit operative to include means for storing bits of an option mask which defines the operational environment for the particular target system being emulated. Different ones of the option mask bits are applied to different hardware portions of the emulator apparatus for conditioning that apparatus to execute programs as they would be executed on the particular system being emulated.

The emulation apparatus also includes means coupled to receive signals indicative of events occurring during the emulation operation together with means responsive to such event signals and to one group of bits of the option mask for signaling the processor to process the events either as part of the normal emulation operation or to process the event executing instructions when in the native mode specified by the coding of the option mask bits. Further, another group of bits of the option mask are coded for defining the maximum addressing capability within the target system being emulated. These bits are applied to different address registers included within the emulation apparatus for conditioning them to generate memory addresses characteristic of the target system being emulated.

The arrangement of the present invention allows for expeditious processing of instructions written for programs executed in a particular processing environment or by different models of a family of target systems. More importantly, the arrangement of the invention provides for concurrent processing of a plurality of target system programs associated with a number of different target system models by the same processing hardware.

The above and other objects of this invention are achieved in an illustrative embodiment described hereinafter. Novel features which are believed to be characteristic of the invention both as to its organization and method of operation, together with future objects and advantages will be better understood from the following description when considered in connection with the accompanying drawings. It is to be expressly understood however, that these drawings are for the purpose of illustration and description only and are not intended as a definition of the limits of the present invention.

BRIEF DESCRIPTION OF THE DRAWINGS

FIG. 1b shows the layout of a process control block included in the main store of FIG. 1.

FIG. 4c illustrates in greater detail a portion of the decoder logic and control circuits utilized by the emulator unit of FIG. 1 in accordance with the present invention.

TABLE OF CONTENTS

1. General Description of Preferred Embodiment
2. Microinstruction Format
3. Detailed Description of Emulation Unit
4. Data Manipulation Section 100-40
5. Op Code Register Section 100-80
6. Indicator Storage Section 100-100
7. Control Logic Section 100-120

8. Option Mask Register 100-124
9. Detailed Description of Decode and Control Circuits 100-84 and 100-58
10. Description of Operation of Preferred Embodiment

GENERAL DESCRIPTION OF PREFERRED EMBODIMENT—FIG. 1

Figure 1:
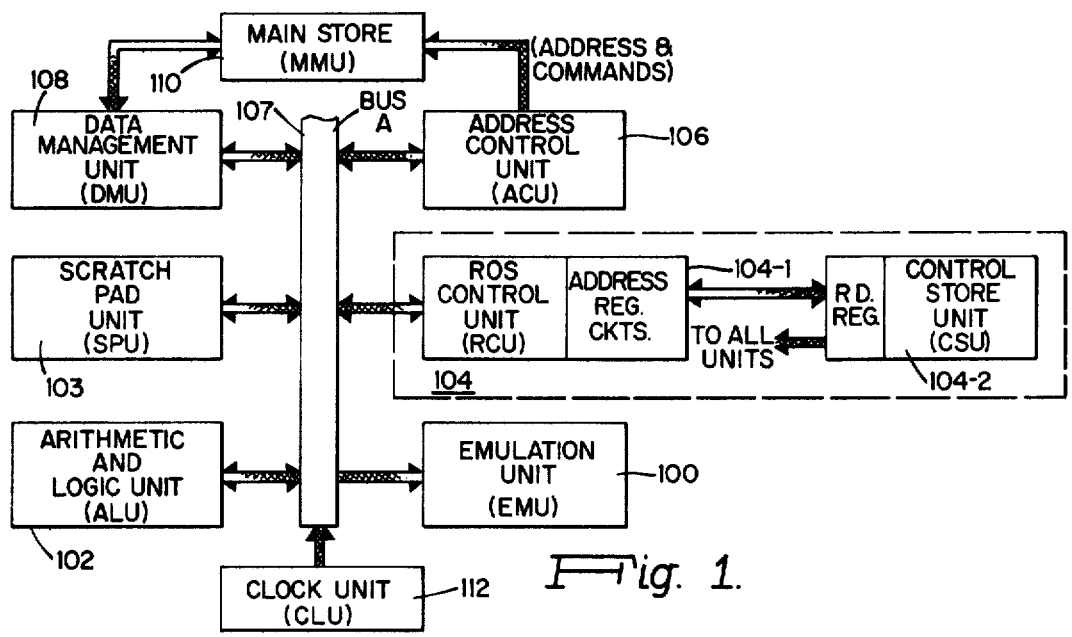
FIG. 1 is a general block diagram of the processor of the present invention.

Referring to FIG. 1, it is seen that the system of the present invention includes a main store 110 and a processor comprising a data management unit (DMU) 108, a scratch pad unit (SPU) 103, an arithmetic and logic unit (ALU) 102, an emulation unit (EMU) 100, a microprogram control unit 104 which comprises a ROS control unit (RCU) 104-1, and a control store (CSU) 104-2, an address control unit (ACU) 106 and a clock unit (CLU) 112 which couple to a multiconductor bus 107 as shown. For the purpose of the present invention, the units of primary concern correspond to EMU 100 and microprogram control unit 104. The remaining units as well as certain portions of the units mentioned may take the form of those units described in the referenced Related Applications as well as the units described in the copending application of Allen C. Hirtle titled "Table Driven Emulation System" bearing Ser. No. 430,322 filed Jan. 2, 1974 which is assigned to the assignee named herein and now U.S. Pat. No. 3,995,180 issued May 4, 1976.

Briefly, the ACU 106 provides absolute addresses for referencing main store 110. More specifically, the unit 106 includes apparatus which transforms segmented addresses into absolute addresses. It will be appreciated that these operations are performed under the control of the microprogram control unit 104. The data management unit 108 provides an interface between the processor subsystem and main store 110. The unit 108 includes circuits which specify which portion of the main store 110 has information to be retrieved during subsequent memory cycles and transfers the information into the processor's registers at the appropriate time.

The SPU 103 provides temporary storage for information used frequently by the processor such as table pointers, base registers, general registers, operands and partial results stored during data manipulation operations. The ALU 102 constitutes the system's arithmetic and logic unit which is operative to execute binary, decimal, logical operations on a multibyte basis. Additionally, the ALU 102 includes circuits for computing segmented effective addresses during address preparation operations.

The clock unit 112 is operative to generate all the timing signals for the processing unit and microprogram control store unit 104. The control store unit 104-2 of unit 104 stores microinstructions which generate signals for controlling the system's operation in either an emulation mode or in the native mode of operation. The read only store unit 104-1 is arranged to provide the branching facilities and other circuits for generating addresses for read out of microinstructions from control store unit 104-2 and for controlling microprogram or "firmware" execution.

The different units coupled to bus 107 are directed by the microprogrammed control unit 104 to perform certain operations. In the particular embodiment shown in FIG. 1, it is contemplated that the processor is arranged to provide emulation operation as an optional mode. Briefly, certain bits within the microinstruction words read out from the read only memory 104-2 applied to bus 107 determine whether the EMU 100 or the ALU 102 is operative for processing a particular program instruction.

The ALU 102 and EMU 100 are switched on and off depending upon the particular instructions to be processed. Each unit may concurrently utilize the facilities of the other units within the system during instruction processing. For further information regarding the switching of the EMU 100 and ALU 102, reference may be made to the related application of Andre Milleret et al.

MICROINSTRUCTION FORMAT—FIG. 2

The control store unit 104-2 stores groups of microinstructions linked together to perform directly executable target system instructions. These microinstructions are stored in 4K (4,096) words of read only memory of unit 104-2. The location selected to start a sequence of microinstructions for execution of a target system instruction is determined by transferring a combination of the bits stored in certain registers within the emulation unit 100. These registers correspond to a base address register and an op code register whose contents are transferred via bus 107 to the RCU 104-1.

The microinstructions stored in CSU 104-2 can be divided into five different groups or families. Each group is arranged to control or exercise a particular portion of the system of FIG. 1. To carry out a step within the target system instruction, this requires that a combination of the five groups of microinstructions work together. The group for controlling the emulation unit 100 corresponds to group 3. The microinstructions of this group condition the emulation apparatus to execute register to register transfers and to perform adding, incrementing, decrementing etc. operations required for that instruction.

Figure 2:
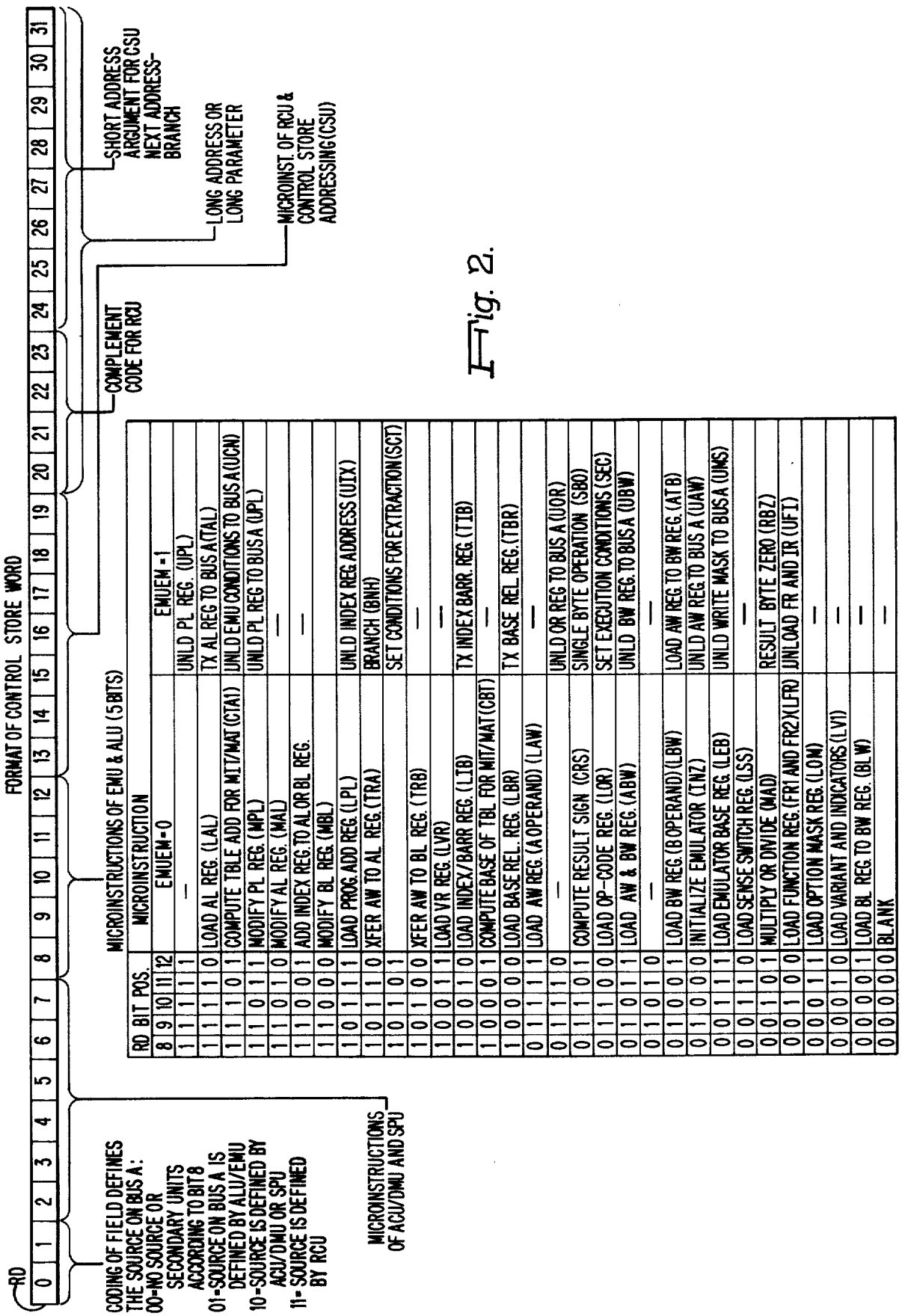
FIG. 2 illustrates the coding of the microinstructions executed by the microprogrammed unit of FIG. 1.
Figure 3:
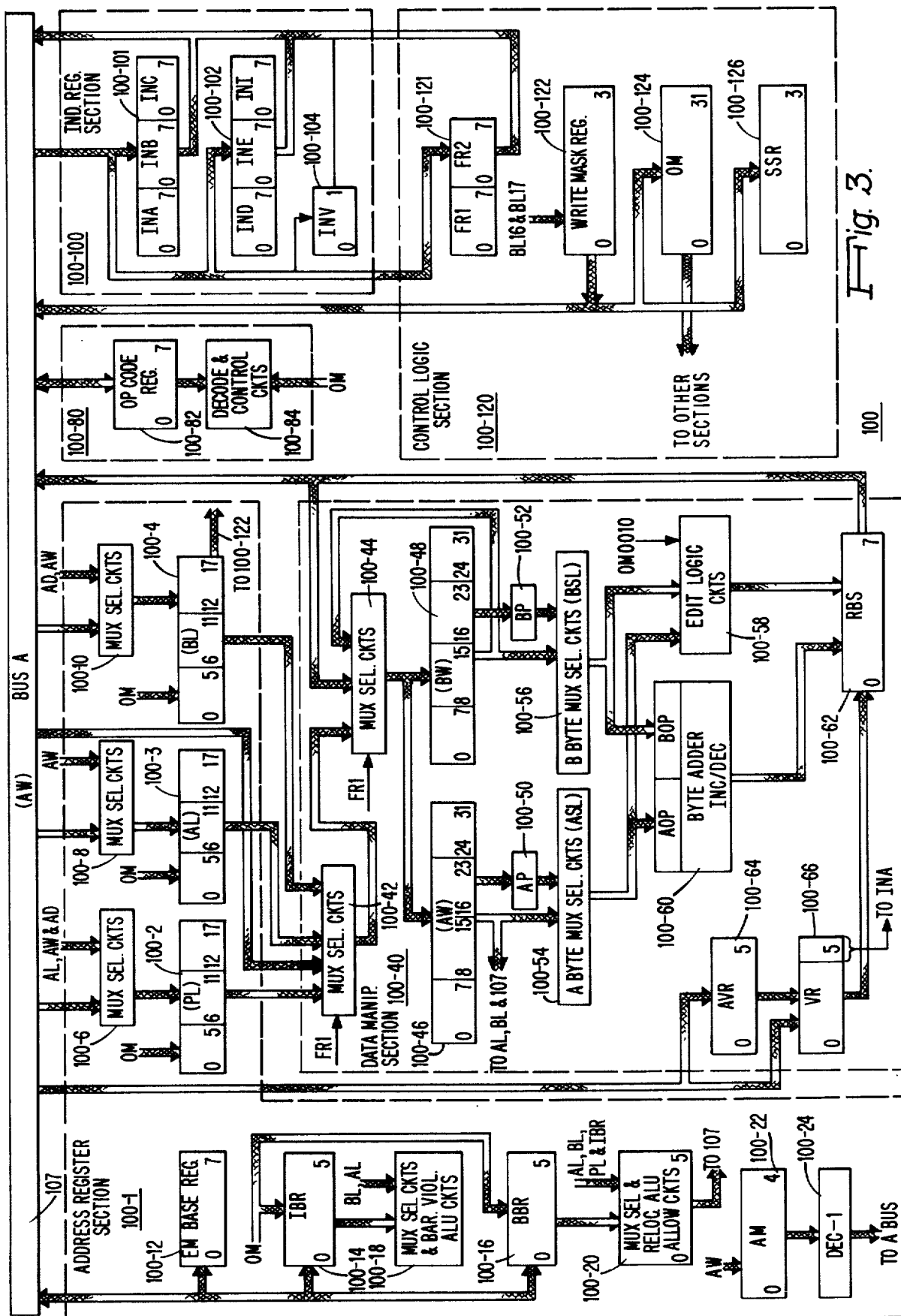
FIG. 3 illustrates in greater detail, the emulation unit of FIG. 1 in accordance with the present invention.

A typical format for these microinstructions is shown in FIG. 2. Referring to the figure, it is seen that each microinstruction word contains 32 bits, each divided into a number of groups. It is seen that bits 0 and 1 of the word are coded to define which one of the units of FIG. 1 is applying signals to bus 107. The next group of bits define microinstructions which are used by the ACU 106, the SPU 103 and DMU 108. Bits 8 through 12 define microinstructions which control operations within the EMU 100 or ALU 102. These microinstructions are as illustrated in the table of FIG. 2.

Bits 13 through 19 define microinstructions for controlling the operation of the ROS control unit 104-1 and control store unit 104-2. The next group of bits provides some checking not pertinent to the operation of the present invention. Bits 24 through 31 constitute an address field which may be combined with bits 20 through 23 to form either a long address or a particular constant or parameter.

DETAILED DESCRIPTION OF EMULATION UNIT—FIG. 3

The emulation unit 100 comprises an address register section 100-1, an op code register section 100-80, a data manipulation section 100-40, an indicator storage section 100-100 and a control logic section 100-120. As seen from the figure, bus 107 connects the emulator unit 100 with the processor such that any information used by the unit must be applied to bus 107 and any information to be transferred to the processor must be applied to bus 107.

The address register section 100-1 includes a program address register (PL) 100-2, an A address register (AL) 100-3, a B address register (BL) 100-4, an index barricade register (IBR) 100-14, a base relocation register (BBR) 100-16, an emulator base register (EB) 100-12 and an address modification register (AM) 100-22 arranged as shown. The program address register 100-2 contains 18 bits of storage received and corresponds to the "sequence counter" of the target system. The register 100-2 is loaded by any one of the sources indicated via the multiplexer selector circuits 100-6.

The A address register 100-3 is an 18 bit register which stores the address of the A operand field of a target system instruction. The B address register stores an 18 bit address specifying the location of B operand field of the target system instruction. Each of the registers mentioned can include circuits for incrementing or decrementing the address contents thereof and these registers and circuits couple to certain ones of the bit positions of option mask register 100-124 of section 100-120 as explained herein. Also, the registers are loaded from any one of the sources indicated which are selected by the multiplexer circuits 100-8 and 100-10.

The six bit index barricade register 100-14 identifies the location which defines the lower limit of a protected area of memory in the target system when the system is running under a storage protection feature. The six bit base relocation register 100-16 stores the base address of an area of memory into which a program can be relocated when the target system is running in a relocation mode (the relocation mode allows the program to be run in a different area of memory than specified by its addresses). Each of the registers couple to the circuits of blocks 100-18 and 100-20 which receive input signals from the registers indicated. These circuits include comparison circuits, conventional in design, for detecting attempts to access non-existent memory or unauthorized segments of memory.

The emulator base register 100-12 stores an 8 bit address of a starting sequence of microinstructions termed a page within CSU 104-2. The address modification register 100-22 stores a 5 bit address corresponding to the modifier bits of a 3 or 4 character mode address. The address can be decremented by circuits of block 100-24. During a multiplication operation, this register is also used to store carries.

DATA MANIPULATION SECTION 100-40

This section performs operand processing and includes a 32 bit A operand register (AW) 100-46, a 32 bit B operand register (BW) 100-48, an 6 bit variant character register (VR) 100-66 and an 6 bit auxiliary variant register (AVR) 100-64 connected as shown. The A and B operand registers 100-46 and 100-48 receive operands from the sources shown via the connected multiplexer selection circuits 100-42 and 100-44. The variant registers 100-64 and 100-66 store target system variant characters received from bus 107.

A pair of AP and BP pointer registers 100-50 and 100-52 initially receive signals from bit positions 16-17 of corresponding ones of the registers 100-46 and 100-48. Signals from these registers are used to select which one of the 4 bytes in registers 100-46 and 100-48 are transferred by corresponding ones of a pair of byte select logic circuits 100-54 and 100-56 to a byte adder 100-60 or to edit logic circuits of block 100-58. The byte adder 100-60 performs logic, binary and decimal operations upon the pair of operands applied to its A operand and B operand inputs. The results produced by adder 100-60 and edit logic circuits 100-58 are applied to a result byte spreader register 100-14 62. This register under microprogram control transfers a single byte result to either register 100-46 or register 100-48 via the multiplexer circuits 100-44 as a function of the particular program instruction being executed.

The edit logic circuits of block 100-58 provide input signals to register 100-48 during the execution of an edit instruction and receiver signals from option mask register 100-124 which condition the operation of such circuits as explained herein.

OP CODE REGISTER SECTION 100-80

The op code register section includes an op code register 100-50 connected to receive 8 bit op code of a target system instruction. The op code signals from this register are applied to a number of decode and control circuits of block 100-84, operative to provide the necessary signals for controlling the operation of the emulation unit 100 under microprogram control as explained herein. Additionally, the op code is applied together with the contents of emulator base register 100-12 via bus 107 to the RCU 104-1 for selecting the correct microprogram sequence for executing a target instruction.

As explained in greater detail in connection with FIG. 4c, the circuits included within block 100-84 also receive signals from the option mask register 100-124. These signals condition different portions of these circuits to execute the target system instructions in the manner defined by the coding of the signals.

INDICATOR STORAGE SECTION 100-100

The indicator storage section includes a plurality of registers 100-101 through 100-104 coupled to bus 107 for storing information necessary for the emulation unit 100 instruction processing. A first 8 bit register of group 100-101 designated INA, stores information pertaining to character mode, compare indicator and decimal indicator information which is shown in greater detail in FIG. 4b.

A second 8 bit register of group 100-101 designated INB, stores information pertaining to auxiliary target system indicators. A third 8 bit register of the group, designated INC, stores information pertaining to target system scientific indicators and sector masks. This information is also shown in greater detail in FIG. 4b.

The next 8 bit register of group 100-102 designated IND, stores information pertaining to target system storage protect features, relocation mode and instruction time out. This information is shown in greater detail in FIG. 4b. The next two 8 bit registers of the group, designated INE and INI, store information pertaining to external interrupts and internal interrupts which is shown in greater detail in FIG. 4b. The last register is a single bit register, designated INV, which stores information pertaining to a branch on condition test (BCT) trap mode of operation. Different ones of these registers also connect to receive signals from option mask register 100-124 which control the switching of various indicators as explained herein.

CONTROL LOGIC SECTION 100-120

The control logic section stores status information and control information for establishing the environment in which the emulation unit 100 is processing target system program instructions. The section 100-120 includes a pair of 8 bit registers, designated FR1 and FR2, which store information pertaining to the status of the emulation unit 100. During instruction extraction, register FR1 stores information about which character is being extracted and error conditions. During instruction execution, it stores information pertaining to operand processing (e.g. recomplement operations, termination of A operand field).

Register FR2 stores information pertaining to extraction, execution, branch conditions, divide information etc.

The remaining registers of section 100-120 include a 4 bit write mask register 100-122, option mask register 100-124 and a sense switch register 100-126. The write mask register 100-122 determines the number of characters to be transferred via bus 107 to the main store 110. The sense switch register 100-126 is a 4 bit register which stores the status of the sense switches of the target system being emulated. Lastly, the 32 bit option mask register 100-124 stores information pertaining to the options, features and characteristics of the target system being emulated. The contents of this register are as illustrated in FIG. 4a and will be discussed in detail with respect to that Figure.

Figure 4A:
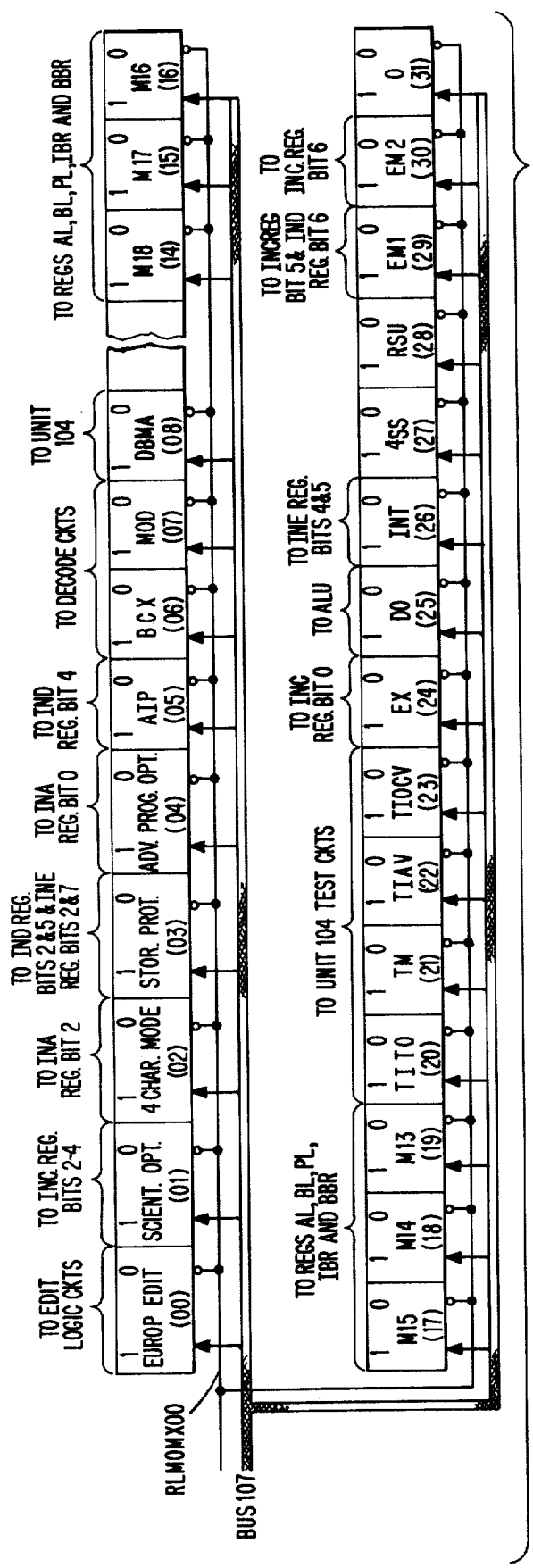
FIGS. 4a and 4b show in greater detail registers included in the emulator unit of FIG. 3 in accordance with the present invention.
Figure 4B:
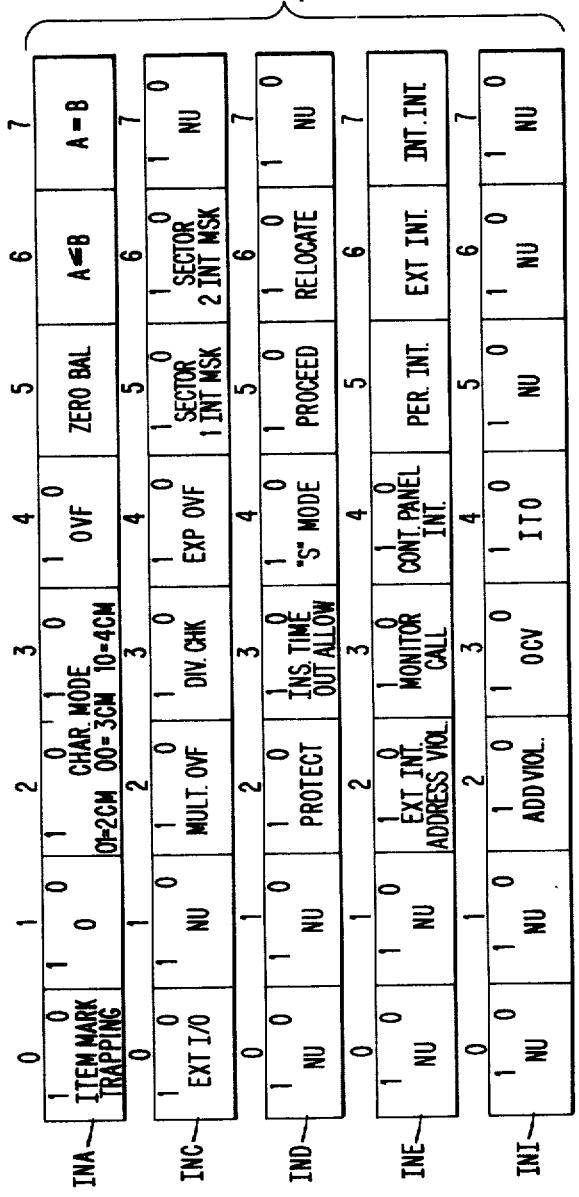

OPTION MASK REGISTER—FIG. 4a

The option mask register (OM) is a 32 bit register which stores information pertaining to options and features included within the series of target systems being emulated. The register is loaded from general register GR9 of the SPU via bus 107 in response to a load option mask register (LOR) microinstruction during an initial entry sequence of microinstructions.

The output signals from the different bit positions of OM register are applied to the different portions of the unit 100 for enabling the logic circuits included for executing target system instructions for different target systems models. The models and the instruction set are discussed in detail in the publication titled "Series 200 Programmer's Reference Manual (Models 200/4200)", Copyright 1971 by Honeywell Information Systems Inc. and designated by order number BA85, Rev. 0.

In greater detail, bit position 0 selectively enables the edit logic circuits which generate the comma and period characters during the execution of an edit instruction (MCE). That is, the series of target systems have models which treat comma and decimal point characters differently. In the so-called American version, the comma (octal 73 character code) delineates thousands, millions, etc. to the left of a decimal point and the period (octal 33 character code) delineates the location of the decimal point. In the so-called European version, the functions of the comma and period are reversed.

The edit logic circuits include circuits for both cases and one of these circuits is selectively enabled by the state of bit position 0. When bit position 0 is a binary ZERO, the American version circuits are enabled and when bit position 0 is a binary ONE, the European version circuits are enabled. The MCE instruction is used to insert identifying symbols and punctuation and to suppress unwanted zeros in a data field.

In performing this operation, the sensing of a zero suppression symbol in an edit control word causes the edited result field to be scanned from left to right. In the American version, blank character codes are inserted in place of high order zeros and commas unless an asterisk code appears immediately to the left of the zero suppression symbol in which case the asterisk symbol replaces high order zeros and commas. The decimal point remains in the edited field in the position where written. In the European version, the function of the comma and period are reversed.

The next bit position, bit position 1, indicates whether the target system includes a scientific option. When this bit position is a binary ONE, indicating presence of option, the emulation unit 100 permits execution of scientific instructions (e.g. floating point load and store, floating point arithmetic, decimal to binary and binary to decimal conversion), the setting of scientific indicator circuits (e.g. exponent overflow, divide check and multiply overflow) via RVI instructions and the storage of such indicator circuits signals via SVI instructions.

When the scientific option is not present on a target system, attempts to use it cause an internal interrupt (i.e. instruction op code is not recognized by the system) wherein the system exchanges the contents of its sequence and internal interrupt registers which alters the procedure to be executed and enters an internal interrupt mode. The attempt to execute an unrecognized op code is treated as an attempt to execute a privileged op code which is regarded as a storage protection violation. The routine entered may then call a simulator routine which replaces the option or may abort the job.

Because the scientific indicators are not present when the option is not present, an RVI instruction is coded to place ONES into the assigned indicator storage. Thus, a subsequent SVI instruction will retrieve only ZEROS which the system can use to determine whether the option is present.

Accordingly, since emulation unit 100 must support target systems with or without this option, bit position 1 establishes whether the circuits for setting the scientific indications are to be enabled and whether the scientific op code circuits are enabled for signaling an internal interrupt.

Bit position 2 defines whether a four character mode of addressing is present. In general, there are three address modes used in the target systems and these modes can be selected in response to a CAM instruction. These modes are described in detail in the referenced Programmer's Manual as well as in U.S. Pat. No. 3,331,056 invented by W. Lethin et al. Some early model of the target systems did not include 4 character mode addressing and the form of the CAM instruction used to specify 4 character mode causes the early models to enter 2 character mode addressing as a default condition.

By including bit position 2, the emulation unit 100 is able to execute CAM instructions in the manner they are executed by the models mentioned. Accordingly, bit position 2 is applied to the circuits which control 4 character mode addressing selection mode in response to CAM instructions as explained herein.

Bit position 3 controls the portion of the emulation unit circuits associated with a storage protection option. As explained in detail in the referenced Programmer's Manual (see Appendix E), those target systems which have this option, are able to use a second set of index registers (Y1-Y15) and allow protect, proceed indicators to be set in response to RVI instructions. The target system can operate in any one of three modes: a standard mode, an external mode and an internal mode. When storage protection is in effect, op code violations and address violations including an attempt to transfer information internally to memory locations within the protected area or to read the contents of a main memory location whose address is greater than the memory present are detected as violations which set a violation indicator and cause an internal interrupt. The lower boundary of the protected area is designated by the number of a 4,096 character memory bank stored in an index/barricade register in response to a load barricade register (LIB) instruction. This instruction is privileged in that it is allowed to be executed in either of the two interrupt modes but prohibited when the system is operating in standard mode with storage protection in effect. An RVI instruction can be used to turn on the proceed indicator which then permits the target system to execute one privileged instruction in the standard mode (e.g. HALT, LCR, PDT, PCB, SVI, RNM or LIB instructions).

Target systems which do not have the option do not recognize RVI instructions used to turn on protect and proceed indicators and will cause an internal interrupt. Additionally, any instruction which includes an index specifying these second set of registers will instead use one of the first set of index registers (X1–X15) available in systems not having the option. Thus, the contents of bit position 3 are used to enable the protect and proceed storage indicator circuits in addition to conditioning the index register address circuits as well as the external interrupt address violation and internal interrupt indicator circuits.

Bit position 4 when set to a binary ONE designates the presence of an advanced program option which may be present on small target systems and is included in all medium and larger target systems. When present, this allows the target system to enter a so-called item mark trap mode of operation via a CAM or RVI instruction and to enable indexing and indirect addressing. The item mark trap mode is a mode in which any instruction op code which contains or is punctuated with a binary ONE in an item mark bit position is treated as a change of sequence instruction. For further details regarding this, reference may be made to the U.S. Pat. No. 3,344,404 titled "Multiple Mode Data Processing System" invented by Kenneth Curewitz.

Accordingly, when bit position 4 is set to a binary ZERO, the target system ignores the index/indirect address modification fields of all instructions as well as not responding to CAM or RVI instructions coded to define the item mark trap mode. Thus, the contents of bit position 4 are used to allow the switching of the item mark trap indicator in response to CAM or RVI instructions. As explained herein, the indicator output is applied to the circuits used to detect op codes containing an item mark. Also, bit position 4 is used to selectively enable the circuits which perform address modification allowing those existing target system programs which were executed on target systems not having this option to disregard safely such address fields in addition to the CAM or RVI op codes mentioned.

Bit position 5 when set to a binary ONE designates an optional feature which includes two instructions and a special programmable mode (i.e. S mode) for handling decimal operands. When present, the target system executes the operations specified by op codes of table lookup (TLU) and move or scan (MOS) instructions and is permitted to enter an S mode in response to CAM and RVI instructions.

Accordingly, when the option is not present, the CAM or RVI instructions coded to define the S mode have no effect. Further, when a target system has the storage protect option but not this option, attempted execution of a TLU or MOS instruction is signaled as a violation which causes the system to enter the internal interrupt mode as mentioned previously. Accordingly, the contents of bit position 5 are used to allow the setting of the S mode indicator circuits in response to CAM and RVI instructions and to condition the decode circuits to detect as illegal the TLU and MOS instruction op codes.

The next bit position, bit position 6, when set to a binary ONE defines that the branch on condition code (BCC) expansion of the advanced program option is in accordance therewith. Specifically, in early models of the target systems, the decoding of certain variant characters contained within a branch on condition (BCC) instruction employed "don't care" conditions which reduced the complexity of the systems decoder circuits. Later target system models interpreted those variant character codes as having other meanings.

Accordingly, the contents of bit position 6 are applied to the variant decoder circuits included within the emulation unit 100 for allowing both definitions in accordance with the advanced program option during the execution of BCC instructions.

Bit position 7 provides special functionality for the emulation unit 100. More specifically, when bit position 7 is a binary ONE and the protection in base mode is set, certain instructions (i.e. PDT, PCB, LCR and SCR) are not treated as privileged.

When the bit position is set to a binary ZERO, the normal target system functionality applies with respect to these instructions as previously explained and as described in the referenced Programmer's Manual. Accordingly, the contents of bit position 7 (binary ZERO output) are applied to the op code decode circuits for allowing them to signal the presence of privileged op codes.

Bit position 8 allows special functionality of the emulation unit 100 (i.e. a new instruction) to be utilized. More specifically, when set to a binary ONE, this bit position enables the op code of a decimal binary multiply (DBM) instruction to be executed. When a binary ZERO, the op code decoder circuits signal the op code (i.e. $47_8$) as being that of an illegal instruction.

Bit positions 9–13 are unused and must be zero. A next group of bit positions 14–19 designated as M18–M13 respectively, are used to establish the size of main memory for a number of target systems and control the magnitude of the addresses generated for accessing memory. These bit positions are used in duplicating so-called memory "wrap-around" or end around memory characteristics to simulate maximum relative address size described in the aforementioned Programmer's Manual.

For example, if one model of target system had 65K of memory installed, then only 16 binary weighted memory address register bits would be in the system. Accordingly, the system addressing would wrap-around when a memory address of 65,535 is incremented by one to zero and when a zero address is decremented by one to 65,535. It will be appreciated that when more memory is added to a target system, this functionality changes requiring an increase in the number of memory address register bits.

Thus, these bit positions are coded to indicate the addressing capabilities of the target system memory address bits $(2)^{18}$–$(2)^{12}$ respectively. For each address bit present in the target system, a corresponding one of the bit positions 14 through 19 is set to a binary ONE. For example, a system having 65K of memory results in bits 14 and 15 (i.e. M18 and M17) being set to binary ZEROS and bits 16–19 (i.e. M16–M13) being set to binary ONES. Accordingly, the emulation unit 100 provides for relative memory addressing from 4K to 256K.

The contents of these bit positions as seen from FIG. 1c are applied to the circuits of the address registers indicated and prevent the setting of address bit positions not installed in the target systems. Specifically, the load gate circuits and carry-borrow gate circuits of these registers are connected to be disabled in accordance with the appropriate ones of these bit positions.

The next four bit positions 20 through 23 are used to trap software and hardware calls from user programs to the emulation system monitor software so that these calls at the discretion of the emulation system software may be trapped to native software routines which could more efficiently process such calls utilizing the host system facilities. If the bit position is set to a binary ONE, the calls are sent to the native system monitor and if they are ZERO, the calls go to the emulation system monitor which handles the calls similar to the way they were processed by the target system.

More specifically, when bit position 20 is set to a binary ONE, all internal interrupt conditions due to an instruction time-out cause the emulation unit 100 under microprogram control to generate an internal interrupt trap (IIT) call to the ESP software instead of setting the instruction time-out (ITO indicator bit and entering the internal interrupt mode of emulation operation under microprogram control). As described in the referenced Programmer's Manual, the instruction time-out function is enabled by a time-out allow function set and reset by SVI and RVI instructions respectively. One way in which time-out can be carried out is described in detail in U.S. Pat. No. 3,426,331 titled "Apparatus for Monitoring the Processing Time of Program Instructions" invented by Thomas Joyce.

Bit position 21 is used to trap monitor call instructions generated during the execution of user programs. The monitor call instruction is used in the target systems as a call mechanism for data transfer and control functions. The user program generates a monitor call followed by 2 to 3 characters of call information to be interpreted by the system monitor.

When bit position 21 is a binary ZERO, this causes the emulation unit 100 to set a monitor call indicator bit which causes the emulation unit 100 to enter an external interrupt mode of operation in which the call is processed in a manner similar to that which occurs in the target system. The monitor call processing instruction is described in the referenced Programming Manual.

When bit position 21 is a binary ONE, the execution of a monitor call instruction causes the generation of a call to the ESP software identifying the reason for the call.

Bit position 22 is used to trap address violations discussed in connection with the storage protection option and is an addressing type fault related to a user program attempting to modify data outside its allocated memory space. When this bit position is set to a binary ONE, the address violations are trapped or cause an IIT call to the ESP software. When the bit position is a binary ZERO, this causes the setting of an address violation (AV) indicator and the entering of the internal interrupt mode as mentioned previously.

The last of this group, bit position 23, is used to steer all interrupt conditions due to undefined or not present or privileged op codes to software routines equivalent to target system software or to the ESP software. When bit position 23 is a binary ZERO, this causes the setting of an OCV indicator and the entering of the internal interrupt mode. When bit position 23 is a binary ONE, this causes an IIT call to the ESP software.

Bit position 24 is used to indicate whether an extended I/O option is present in the target system. This option enables additional read/write counters to be used for data transfer operations in larger size target systems. When bit position 24 is a binary ONE, a RVI instruction is permitted to set the extended I/O indicator of the INC register to a binary ONE. When bit position 24 is a binary ZERO, the indicator cannot be set.

Bit position 25 is used when the target system software to be executed was developed for a specific target system (i.e. H201-0, 1 system) which has its own unique operating characteristics. One of the differences in this system is the manner of handling arithmetic operands as regards the signs and the non-numeric values of decimal operands. Bit position 25 when set to a binary ONE conditions the emulation unit's arithmetic unit to function as the particular target system in its handling of decimal operands.

Bit position 26 when set to a binary ONE allows the emulation unit 100 to process interrupts in accordance with a program interrupt option. That is, the emulator unit 100 interrupts its operation in response to an external interrupt produced by any one of three sources: a control panel button; a monitor call instruction; or a peripheral controller terminating an I/O operation.

The next bit position 27 designates to the emulation unit 100 whether the target system had 4 to 8 sense switches located on the control panel used for program control. When set to a binary ONE, this indicates that there are only 4 sense switches which can be tested during execution of a BCT instruction. Bit positions 28 and 31 are not used.

Bit positions 29 and 30, designated EM1 and EM2, are used to indicate the presence of an extended multi-programming option and a second I/O sector respectively. The primary use of these bit positions is to mask the result of the RVI instruction which attempts to load the relocate and sector interrupt mask indicators.

Each I/O sector has associated therewith a ONE bit mask which is stored and set by SVI and RVI instructions respectively. The mask determines the manner in which interrupts from sources in a sector are processed. Since all target systems have at least one I/O sector, bit position 29 really indicates the presence of the multiprogramming option (i.e. bit 29=1) as well as preventing the setting of the relocate and sector 1 interrupt mask indicator when the option is not present (i.e. bit 29=0). When bit position 29 is a binary ONE, bit position 30 is set to a binary ONE when the second I/O sector is present. This allows the emulation unit 100 to set the sector 2 interrupt mask indicator. For further discussion regarding target system sector operation, reference may be made to the Programmer's Manual described above.

DETAILED DESCRIPTION OF DECODE AND CONTROL CIRCUITS —FIG. 4c

Before describing the operation of the present invention, a portion of the circuits of blocks 100-84 and 100-58 will first be described with reference to FIG. 4c.

Referring to the figure, it is seen that the edit logic circuits block 100-58 include a plurality of AND gate circuits 100-500, 100-501 and 100-508 together with an OR gate circuits 100-504 and 100-506 are operative to generate a replace blank signal during the processing of an MCE instruction. The pair of AND gate circuits 100-500 and 100-502 receive the binary ONE and binary ZERO outputs from bit position 0 of the option mask register. When the bit position is a binary ONE indicating the European version, the edit circuits decoding of a decimal point character causes the replace blank signal to load the RBS register with a blank character code (i.e., $(15)_8$). Similarly, when bit position 0 is a binary ZERO, the edit circuits decoding of comma character code causes the RBS register to be loaded with a blank character code. Of course, it will be appreciated that the signals applied to AND gate circuit 100-508 must also be binary ONES (i.e., the conditions indicated must be true).

The circuits of block 100-84 include a number of binary to decimal decoder circuits 100-830 through 100-838 connected as shown. The first two decoder circuits 100-830 and 100-834 provide decodes of the upper three bit positions (i.e., bits 2–4) and lower three bit positions (i.e., bits 5–7) respectively of the op code contents of register 100-80. The first two bits of the op code contain item mark and word mark code. The next group of decoder circuits 100-832, 100-836 and 100-838 provide decodes of selected combinations of output signals from decoder circuits 100-830 and 100-834 in addition to signal from op code register 100-80. Each output terminal of this group of decoder circuits is used to designate the presence of a different op code as shown.

Additionally, the gate circuits 100-800 through 100-806 are connected to signal the presence of an illegal op code as a function of the state of option mask bit positions 1 and 5. As mentioned previously, when the scientific option is not present, the presence of any scientific op code causes an illegal op code signal to be forwarded to the error circuits and result in an op code violation indicator of register INI being switched to a binary ONE. Also, the op code signal is applied to bus 107 in response to one of the microinstructions of FIG. 2 read out during instruction extraction as explained herein. Similarly, when the advised instruction package option is not present, (i.e., option mask bit position 5 is a binary ZERO), the op code of a TLU or MOS instruction will also cause the generation of an illegal op code signal.

The next group of gates 100-820 are used to signal the presence of a privileged illegal op code. The AND gate 100-808 in response to a particular type of LCR instruction when the MOD 1 option is not present (i.e., option mask bit position 7 is a binary ZERO) causes OR gate circuit 100-820 to generate a privileged illegal op code signal which is forwarded to the error circuits. The or gate circuit 100-816 serves as a collector for all decoded privileged op codes. The presence of any such op code in the absence of a proceed indicator of the IND register being set to a binary ONE when the emulation unit 100 is in a base protect mode also causes gate circuit 100-820 to generate the privileged illegal op code signal. This signal is also applied to bus 107 in response to one of the microinstructions of FIG. 2.

The pair of AND gate circuits 100-852 are operative to generate a branch condition fulfilled signal upon the decoding of a BCC instruction with certain variant characters (i.e., have $(7)_8$ as upper digit) when option mask bit position 6 is a binary ONE signalling the presence of this feature.

Since the remaining signals stored in option mask register 100-124 connect directly as enabling/disabling inputs to different ones of the emulation units registers or are applied to the branch test circuits of the RCU 104-1, it is believed that no further detail is required.

For the purpose of the present invention, the various registers, checking circuits, multiplexer circuits, ALU's, etc., discussed above can be considered conventional in design and may, for example, take the form of the circuits disclosed in the text titled "The Integrated Circuits Catalog For Design Engineers" published by Texas Instruments Incorporated dated 1972.

DESCRIPTION OF OPERATION OF PREFERRED EMBODIMENT

With reference to FIGS. 1 through 4c, the operation of the emulation unit 100 in accordance with the represent invention will now be described. The emulation unit 100 and microprogram routines associated therewith, together termed the compatability feature can be activated in response to a start program instruction issued to a process which has a decor capability byte of $(02)_{16}$ or by the execution of an EXDE instruction with a decor capability of $(02)_{16}$. The values stored in the PMW3 location (i.e., DETSZ and DETA) are referenced to establish that the system includes the emulation capability specified by the EXDE instruction.

Figure 1A:
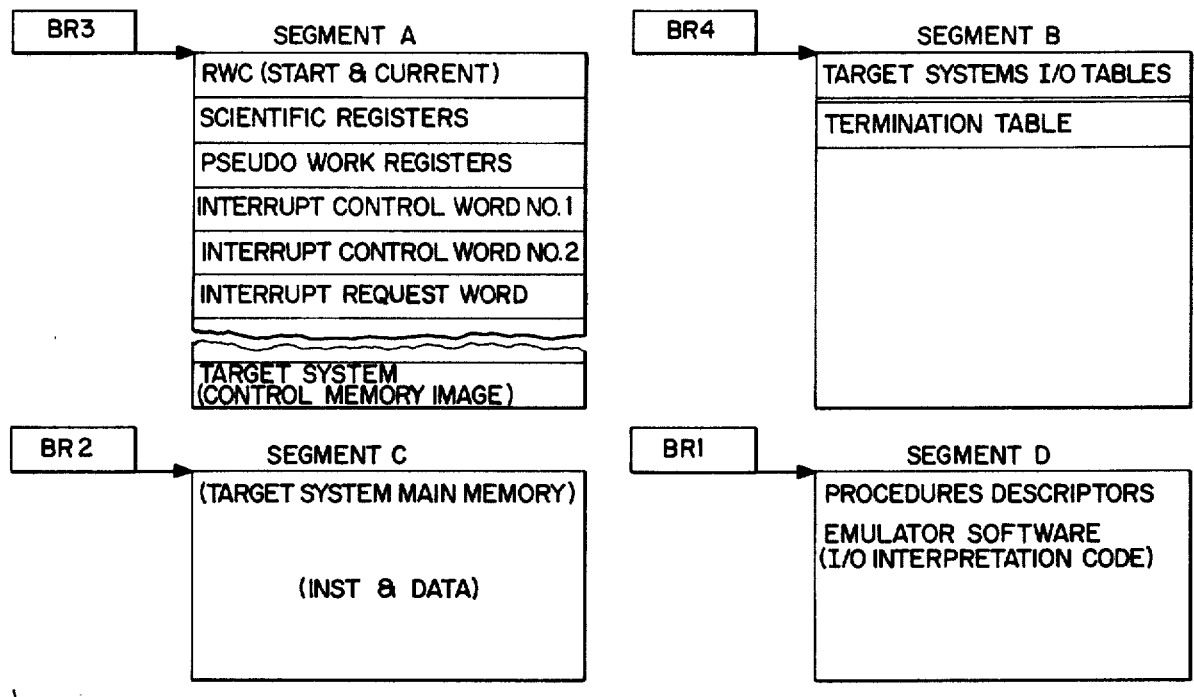
FIG. 1a illustrates diagrammatically the layout of the main store as it applies to the present invention.

Before executing such instructions, various memory registers and tables must be initialized and the process control block (PCB) must be conditioned to store the appropriate information for running a target system program. The format and type of information stored in main store 100 and in the PCB are illustrated in FIGS. 1a and 1b, respectively.

Briefly, the main store 110 is divided up into a plurality of segments which are accessible by a given process definable by the operating systems software. The main store emulator and data structures as seen from FIG. 1a include a plurality of segments (A through D).

Segment A is coded to store an image of the target system control memory (e.g. read-write counters, etc.) and is identified by the contents of base address register 3 (BR3). Segment B includes the input-output tables and is accessed by the contents of base address register 4 (BR4).

The target system main memory is allocated to segment C and is identified by the contents of base address register 2 (BR2). The segment size is arranged to be equal to the memory size of the target system being emulated.

Segment D includes the tables and routines for handling those functions not being carried out by the hardware or "firmware" of the system. For example, the software portion, emulation support package (ESP), is operative to translate and execute target system input/output instructions. Also, it can simulate various hardware portions of the target system architectures or signal the native operating system to perform certain operations heretofore performed by the target systems or software associated therewith as explained herein.

Although not shown in FIG. 1a, there is a segment or portion of a segment in main store 110 which contains the PCB. As mentioned, the PCB is illustrated in FIG. 1b.

Referring to FIG. 1b, it is seen that relative locations 0–12 store process information and include the DEXT byte which has a code of $(02)_8$ for specifying the emulation unit. The group of locations pertinent to the present invention include general registers GR0 through GR15.

General register GR0 stores the INV. INA, INB and INC bytes. General register 4 (GR4) stores the IND byte while general register 9 (GR9) stores the compatibility feature control word (CFCW) which corresponds to the option mask word. General register 13 (GR13) stores the base relocation register and index barricade register information. The locations 148 through 176 provide storage for scientific accumulator information as indicated.

It is assumed that the system has executed an EXDE instruction which is coded to specify that the system is to run in the emulation mode. For the purpose of the present invention, the native EXDE instruction can be regarded as a conventional mode switching instruction. However, for further information concerning the EXDE instruction, reference may be made to the patent application of Marc Appell et al.

Upon entering the emulation mode, the microprogrammed control unit 104 causes the CSU 104-2 to reference an initial entry routine. The initial microinstructions when executed cause the loading of the contents of the general register locations of the PCB into corresponding locations of the SPU 103 for immediate reference. Another group of microinstructions load the appropriate values for the base register locations of the SPU 103.

For the purpose of the present invention, the above operations can be viewed as housekeeping functions which are performed in a conventional manner. However, for additional information, reference may be made to the above mentioned copending patent applications to Marc Appell et al, and Allen C Hirtle.

Continuing on with the description, during the initial entry routine, a sequence of microinstructions are executed for enabling certain ones of the registers of emulation unit 100. A TIB microinstruction when executed causes the index barricade register contents of SPU location GR13 to be loaded into the IBR register. During a following cycle, a TBR microinstruction loads the base relocation register contents of GR 13 into BRR register 100-16 which was reset during a previous cycle of operation.

Another microinstruction causes the second word of variants and indicator registers IND, INE and INI to be loaded from one of the SPU locations via bus 107. During a next cycle of operation, a LOM microinstruction causes the option mask register 100-124 to be loaded from location GR9 of the SPU via bus 107. The SPU is conditioned to address location GR0 for read out of the first word of variants and indicators therefrom which are then loaded into registers INA, INB, INC and INC of FIG. 3 in response to a LVI microinstruction.

A LEB microinstruction when executed causes the microprogram base address to be transferred via bus 107 and loaded into the EM base register 100-12. Next, a LPL microinstruction loads the program register 100-2 via bus 107 from the SPU location GR2. During a next cycle, a LSS microinstruction causes the loading of the sense register 100-126.

At the completion of this routine, the microprogram control unit 104 references a process start routine which performs various checking operations such as checking base registers at the conclusion of which the unit 104 begins extraction of the first target system program instruction from main store 110.

Briefly, the starting address of the target system program stored in program register 100-2 is applied to bus 107, from there loaded into the RCU register and a main memory cycle is initiated to read the first word (4 bytes) of the program instruction into a program buffer register of the DMU 108. Another memory cycle is initiated following the incrementing of the starting address.

The op code character and A address characters are transferred from the program buffer to bus 107. They are also stored in the SPU 103. The high order two bits of the op code character are transferred from bus 107 to the op code register 100-82.

During a next cycle, a branch microinstruction tests the state of the item mark trapping mode bit position of the INA register. It will be appreciated that in the case of CAM and RVI instructions, the trap mode indicator will only be set when the option mask bit position 4 is a binary ONE. If set, the op code register bit positions 2–7 are forced to a value "100011" which corresponds to a change sequence mode instruction. When the indicator is not set, the bits 2–7 of the op code are transferred from bus 107 into the op code register 100-82. Also, bit 1 of the FR2 register is set indicating extraction phase of instruction processing. The decode circuits of FIG. 4c operate to decode the op code producing an output signal indicating the octal value.

The configuration of bit positions 2 and 3 determine the character mode. As mentioned, the state of bit position 4 of the option mask register 100-124 when set to a binary ONE enables a CAM instruction to switch bit position 2 of the INA register to a binary ONE, specifying a 4 character mode.

During instruction extraction, a microinstruction tests for the presence of an illegal op code. The circuits of FIG. 4c in the presence of a scientific op code or a TLU or MOS op code in the absence of the option mask bit positions 1 or 5 being set cause gate circuit 100-806 to generate an illegal op code signal. This causes the second word of indicator (i.e., IND, INE and INI registers) to be transferred to a RCU register via bus 107. A microinstruction causes the illegal op code, privileged op code and error signals to be applied to different bit positions of bus 107 and from there the signals are loaded into an analysis register included as part of the branching circuits of CSU 104-2.

Figure 5:
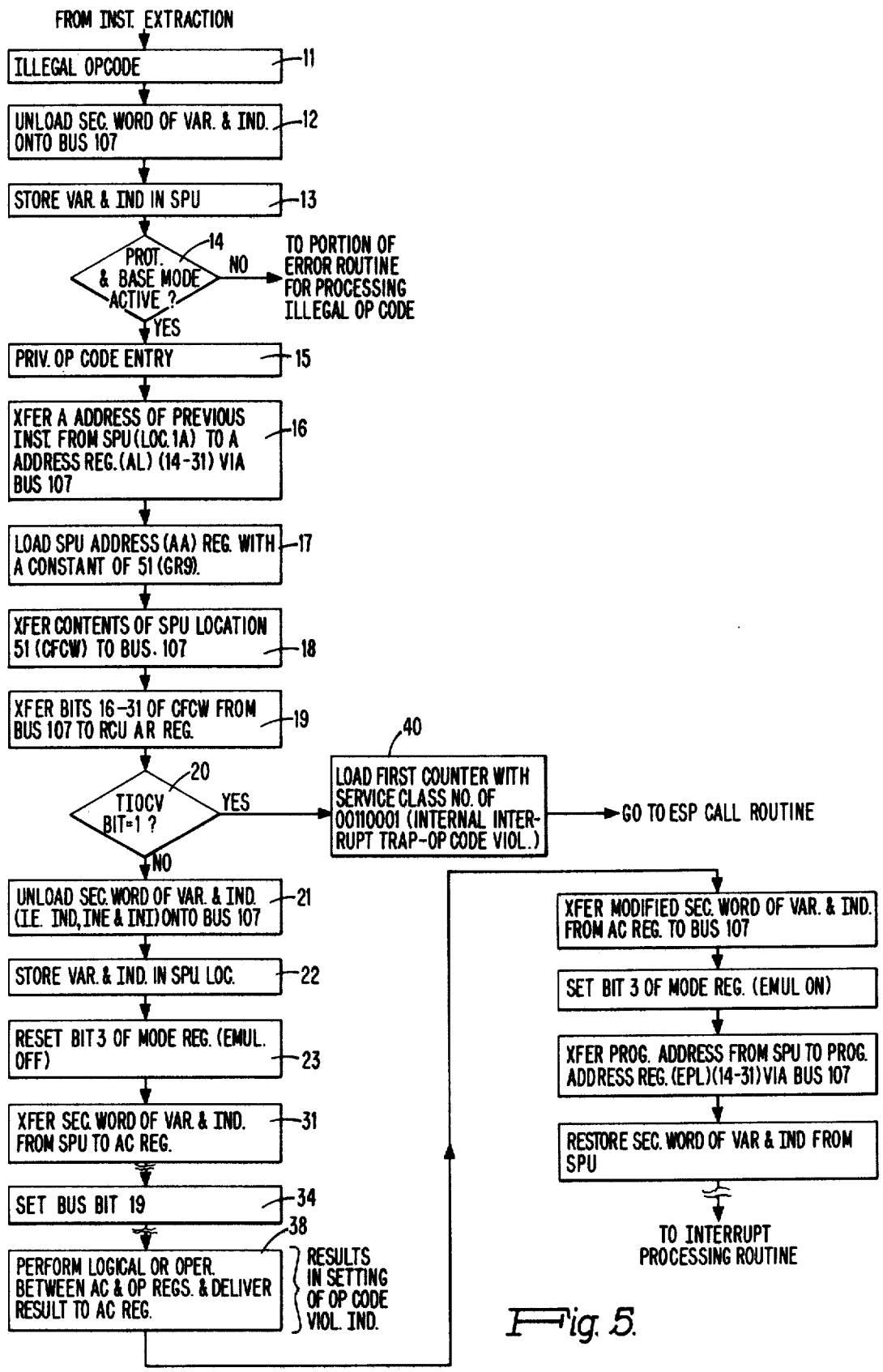
FIG. 5 is a flow chart used in explaining the operation of the present invention.

The microprogram control unit 104 then executes a branch microinstruction which in response to the presence of an illegal op code signal branches the read only memory in FIG. 5. Referring to the figure, it is seen that the contents of indicator registers IND, INE and INI are stored in the SPU 103 and the protect indicator is tested. If not set, the CSU 104-2 branches to a portion of the routine for processing the illegal op code.

It is also seen from FIG. 5 that when the protect indicator is set, this signals the presence of a privileged illegal op code. In processing this type of condition, the CFCW contents corresponding to the option mask word are referenced and the state of the TIOCV bit is tested. When it is a binary ONE, this causes the CSO 104-2 to branch to microinstructions which generate a call to the ESP indicating the reason for the call. This enables the host system to employ native instructions for more expeditious processing of the error condition. When bit TI OCV is not a binary ONE, the microprogrammed unit 104 continues execution of the routine which results in the setting of the op code violation indicator and the execution of an interrupt processing routine. In a similar fashion, the states of the TITO, TIAV and TM bit positions of the option mask word also determine upon the occurrence of other error conditions whether native routines or emulator routines are to process the error condition.

Following extraction of the target system instruction, the microprogrammed unit 104 is operative to branch to an appropriate microprogram routine for instruction execution. As mentioned above, the start of the routine is defined by the contents of the emulation base register 100-12 and op code register 100-82. Briefly, assuming a two address target system instruction, the A address contents of the A address register 100-3 are applied to bus 107 and used to obtain the first four characters of the A operand. The operand is loaded into the A operand register 100-46. Similarly, the B address contents of the B address register 100-4 are applied to bus 107 and used to obtain the first four characters of the B operand which is loaded into the B operand register 100-48 via multiplexer selector circuits 100-42 and 100-44. Thereafter, the byte adder 100-60 performs the designated operation upon the operands under microprogram control.

During target system instruction execution, different ones of the mask bit positions define the manner in which such execution is to proceed. For example, in the case of a MCE instruction, the circuits of block 100-58 of FIG. 4c are operative to substitute blank character codes for comma and decimal characters during zero suppression operation into RBS register circuits 100-62 of FIG. 3 in accordance with the state of option mask bit position 0.

In the case of a decimal add/subtract instruction (DA/DS), the state of option mask bit position 25 can be used to condition the byte adder 100-60 for processing decimal operands consistent with a particular model of target system.

The option mask bit position 7 during the execution of certain types of BCT instructions conditions the AND gate circuit 100-852 to generate a branch condition fulfilled when the bit position is in a binary ONE state. Option mask bit positions 14 through 19 by proper conditioning of the AL, BL, PL, IBR and BBR registers enable the correct generation of main store addresses which in turn enables detection of barricade address violations and address relocation operations to be performed properly.

From the foregoing, it is seen that through the employment of an option mask register, an emulation unit is able to process concurrently program instructions previously written for a number of different target system models. In addition to minimizing system complexity, the arrangement of the present invention affords considerable flexibility in processing target system programs. Moreover, the arrangement facilitates the addition of new features, new combinations of existing features to be included in the target system models or the addition of native software for carrying out operations with greater efficiency.

It will be obvious to those skilled in the art that many changes can be made to the illustrated embodiment without departing from the scope of the present invention. For example, an emulation unit such as that disclosed in the copending patent application of Allen Hirtle referenced above may be used in the arrangement of the present invention.

While in accordance with the provisions and statutes there has been illustrated and described the best form of the invention known, certain changes may be made to the system described without departing from the spirit of the invention as set forth in the appended claims and that in some cases, certain features of the invention may be used to advantage without a corresponding use of other features.

What is claimed is:

1. A data processing system comprising:
a memory for storing in a first segment instructions of at least one system program, each instruction including an op code, storing in another segment control information including a control mask word, said control mask word having a plurality of bits, each bit being coded to designate the presence of a different one of a number of capabilities including a number of operational options includable within any one of a number of different models of a series of target systems each having a similar architectural structure; and,
processing means for processing instructions of said program received from said memory, said processing means including:
multibit position storage means for storing bit signals representative of said control mask word;
data manipulation means for manipulating operands specified by different ones of said instructions received from said memory to perform those operations specified by the opcodes of said different ones of said instructions;
op code decode means for receiving the op code of each instruction for decoding; and,
means for selectively connecting different bit positions of said storage means to said data manipulation means and to said op code decode means, said processing means being conditioned by said means to execute only those target system instructions executable by a particular model of said series of systems having the capabilities specified by the coding of said bits of said control mask word.

2. A data processing system comprising:
a memory for storing in a first segment instructions for at least one target system program, each instruction including an op code and some instructions including at least an operand address portion and for storing in another segment control information including a control mask word, said control mask word having a plurality of bits, each bit for designating a different one of a number of capabilities including a number of operational options includable within different models of a series of target systems characterized as having similar architectural structures; and,
emulation means for executing instructions of said target system program for any one model of said series of target systems, said emulation means being operatively coupled to receive said instructions from said memory and including:
multibit position storage means for storing coded bit signals representative of said control mask word contained in said another segment;
data manipulation means for manipulating operands specified by said operand address portions of different ones of said instructions received from said memory to perform the operations specified by the opcodes of different ones of said instructions;

op code decode means for receiving said op code of each instruction for decoding; and, means for selectively connecting different bit positions of said multibit storage means to said data manipulation means and to said op code decode means, said data manipulation means and said op code decode means being conditioned by said coded bit signals of said control mask word to execute only those instructions associated with one of said models of said series of target systems having those capabilities specified by the coding of said bits of said control mask word.

3. The system of claim 2 wherein said op code decode means includes:

decode means being operative to generate signals in response to said op code indicating the type of operation to be performed; and, a plurality of logic circuit means, different ones of said circuit means being coupled to said decode means and to different ones of said bit positions of said multibit position storage means, each said different one of said circuit means being enabled by said storage means for processing different ones of said instructions of said one target system program only when the bit positions associated therewith are in a predetermined state defining that said one model includes different ones of said number of capabilities required for executing said instructions in the same manner as said one model.

4. The system according to claim 3 wherein said emulation means includes means coupled to said different ones of said circuit means, said means being conditioned by said circuit means to generate event control signals indicating attempts to process types of instructions inhibited by different ones of said control mask bits having not been set to said predetermined state.

5. The system of claim 4 wherein said system further includes microprogram control means for storing microinstructions of a plurality of native and emulation microprogram routines for generating signals for controlling the operation of said system when operating in a native mode in an emulation mode, respectively, said control means being operative in response to said event control signals during the execution of one of said emulation routines to reference a predetermined one of said microinstruction sequences, said predetermined one of said sequences generating signals for testing the state of another one of said control mask bits of said storage means, said microprogram control means being conditioned by said another one of said control mask bits when in a predetermined state to execute native microinstruction sequences for processing said event control signals in place of emulation microinstruction sequences for increasing system efficiency in processing said event signals generated in response to said types of target system instructions.

6. The system of claim 4 wherein said types of instructions conditioning said means for generating said event control signals include a group of instructions having op codes coded to specify the execution of floating point operations.

7. The system of claim 2 wherein said emulation means further includes a plurality of address registers, each having a predetermined number of bit positions for storing address information required for the processing of said target system instructions by said series of target systems; and, means connecting a predetermined group of said bit positions of said multibit position storage means to different bit positions of said plurality of address registers, said address registers being conditioned by the contents of said predetermined group of said bit positions to store addresses whose magnitude is established by the contents of said group of bit positions coded for simulating the addressing capability of said one of said models intended to execute said target system instructions.

8. The system of claim 7 wherein said data manipulation means includes:

arithmetic and logic means;

output register means coupled to said arithmetic and logic means for receiving signals corresponding to the results of an operation specified by said op code being performed by said arithmetic and logic means upon said operands; and, control logic means coupled to said arithmetic and logic means, said output register means and to at least one bit position of said multibit position storage means, said control logic means when enabled by the contents of said one bit position to condition said output register means and said arithmetic and logic means for producing result signals comparable to the results generated bu said one of said models.

9. The system of claim 8 wherein said data manipulation means further includes at least one register for storing control variant characters included in control instructions of said target system program and coded to define conditions to be tested by said emulation means during the execution of said control instructions and wherein one of said plurality of logic circuit means includes logic means coupled to said one register and to a predetermined bit position of said multibit position storage means, said logic means being conditioned by the contents of said predetermined bit position for decoding of said control variant characters for testing said conditions in the same manner as said one of said models.

10. The system of claim 8 wherein said system further includes character mode indicator means for storing signals defining a character address mode of operation for fetching said operand addresses of said target system instructions by said emulation means, said indicator means being coupled to one of said multibit positions of said multibit position storage means, said indicator means being conditioned by the contents of said one bit position to store signals in response to a control instruction which define said character address mode for said one of said models in the manner specified by the coding of said one bit position.

11. The system of claim 8 wherein said system further includes storage protection indicator means for specifying a protection mode of operation for said emulation means for the referencing of said memory during execution of said instructions;

said protection indicator means being coupled to one of said multibit position indicator means, said protection indicator means being conditioned by the contents of said one bit position to store signals in response to a control instruction included in said target system program for establishing said protection mode for said one of said models in the manner specified by the coding of said one bit position.

12. The system of claim 8 wherein said system further includes mode indicator means for storing signals in response to predetermined control instructions included in said target system program specifying an additional address capability included in a number of models of said series of target systems, said mode indicator means being coupled to one of said bit positions of said storage means and to one of said logic circuits of said op code decode means, the contents of said one bit position conditioning said mode indicator means to allow trapping of each instruction having an op code including an item mark bit and for conditioning of said emulation means to modify said addresses of said instruction in the same manner as said one of said models intended to execute said target system instructions.

13. A data processing system including processing means, a memory having a plurality of segments, a first one of said segments storing instructions of at least one target system program, each instruction including an op code portion, some instructions including at least one operand address portion and a second one of said segments storing control information words defining the operational status of a process to be run in addition to information for referencing said instruction of said target system program and a microprogrammed control means coupled to said memory and to said processing means, said control means including a plurality of sequences of microinstructions for generating signals for conditioning said processing means for operating in native and non-native modes, said system further comprising:
  a control information option mask word included in said control information words, said option mask word having a plurality of bits, different ones of said bits coded for defining the presence of different ones of a total number of capabilities including a number of operational options includable within a plurality of different system models of a series of target systems whose programs are required to be executed by said processing means when operated in said non-native mode;
  said processing means including means coupled to receive said target system instructions from said first segment, said means including;
  a plurality of register means for storing address and control information required for the processing of said instructions, said registers including a multibit position control register means for storing signals representative of said option mask word;
  data manipulation means coupled to receive signals identified by said operand address portions of said instructions for processing said received signals in accordance with the corresponding opcode portion of said instructions;
  op code decode means for receiving the op code portion of each instruction for decoding; and,
  a number of logic circuit means for generating signals for providing said total number of capabilities includable within said series of target systems, said number of logic circuit means being coupled to different bit positions of said control register means, to said data manipulation means and to said op code decode means for enabling the execution of said target system instructions of programs written for execution by any one of said target system models of said series of target systems; and,
  said microprogrammed control means including microinstructions for generating signals for loading said control register means and different ones of said register means executed preliminary to the execution of sequences for processing of said instructions of said target system program, said logic circuit means being selectively enabled by signals representative of said option mask word to execute instructions of said target system program for one of said models having present only those capabilities specified by the coding of said option mask word.

14. The system of claim 13 wherein said non-native mode is an emulation mode.

15. The system of claim 14 wherein said op code decode means includes:
  decode means being operative in response to said op code to generate signals indicating the type of operation to be performed; and wherein said logic circuit means includes
  a plurality of circuit means, different ones of said circuit means being coupled to said decode means for receiving said signals and to different ones of said bit positions of said control register means, each said different one of said circuit means being enabled by said control register means for executing the type of operation specified by said signals generated by different ones of said instructions of said one target system program only when the bit positions associated therewith are in a predetermined state indicative of the presence of a corresponding operational capability within said one of said models intended to execute said target system program.

16. The system according to claim 14 wherein said means includes means coupled to said different ones of said circuit means, said means being conditioned by said circuit means to generate event control signals indicating attempts to process types of instructions inhibited by the coding of different ones of said option mask bits.

17. The system of claim 16 wherein different ones of said sequences include microinstructions for generating signals for testing the state of another one of said option mask bits of said control register means for conditioning said microprogrammed control means to execute native microinstruction sequences for processing said event control signals in place of emulation microinstruction sequences for increasing system efficiency in processing said event control signals generated in response to said types of target system instructions.

18. The system of claim 14 wherein said plurality of registers further includes a group of address registers, each address register having a predetermined number of bit positions for storing address information required for the processing of said target system instructions by said series of target systems; and,
  means connecting a predetermined group of said bit positions of said multibit position control register means to different bit positions of said plurality of address registers, said address registers being conditioned by the contents of said predetermined group of said bit positions to store addresses whose magnitudes are established by said group of bit positions coded for simulating the addressing capability of one of said models intended to execute said target system instructions.

19. The system of claim 18 wherein said data manipulation means includes:
  arithmetic and logic means;
  output register means coupled to said arithmetic and logic means for receiving signals corresponding to the results of an operation specified by said op code being performed by said arithmetic and logic means upon a pair of operands specified by one of said instructions; and, control logic means coupled to said arithmetic and logic means, to said output register means and to said logic circuit means, said control logic means when enabled by said logic circuit means in accordance with predetermined ones of said control register means, the contents of bit positions conditioning said output register means and said arithmetic and logic means for producing result signals comparable to the results generated by said one of said models.

20. The system of claim 14 wherein said means further includes indicator means for specifying protection modes of operation for different ones of said models for the referencing of said memory during execution of said target system instructions;

said indicator means being conditioned by said logic circuit means in accordance with the contents of other predetermined ones of said control register means to store signals in response to target system control instructions of said target system program for establishing said protection modes for different ones of said models in the manner specified by the coding of said option mask word.

21. A multiprogrammed data processing system including a memory having a plurality of segments, one segment for storing instructions for at least one target system program, some instructions including at least one operand address and each instruction including an op code portion and a number of other segments for storing a plurality of process control blocks, one for each process being run in said system, each of said blocks including control information for defining the state of a process at any given instant of time in addition to information for referencing said instructions of said target system program, processing means for processing instructions, and microprogrammed control means for generating control signals in response to said instructions, said control means being coupled to said memory and to said processing means, said control means including a plurality of sequences of microinstructions including microinstructions for generating signals for conditioning said processing means to operate in a native and in an emulation mode, said system further comprising:

a control information option mask word included in each of said control information words of each of said plurality of process control blocks, each said option mask word having a plurality of bits, different ones of said bits defining different options includable within a number of different models which comprise a series of target systems whose programs are required to be executed by said processing means when operated under the control of any one of said plurality process control blocks coded for specifying said emulation mode;

said processing means including emulation hardware means for executing instructions of said target system program read out from said one segment, said emulation hardware means including:

a plurality of register means for storing information required for processing instructions designated by each of said process control blocks coded for specifying said emulation mode, said plurality of register means including a multibit position register means for receiving signals representative of said option mask word;

data manipulation means for manipulating operands specified by the operand addresses of different ones of said instructions to perform those operations specified by the opcodes of said different ones of said instructions;

op code decode means for decoding the op code of said each instruction received from said memory; and, control logic means selectively coupling different bit positions of said position register means to said data manipulation means and to said op code decode means, the contents of said different bit positions conditioning said emulation hardware means to execute target system instructions originated for any one of said models of said series of target systems; and, a predetermined one of said plurality of sequences including microinstructions for generating signals for loading said option mask register means and different ones of said plurality of register means preliminary to executing sequences of microinstructions for processing instructions of a process operating under the control of one of said process control blocks coded for specifying said emulation mode, said microprogrammed control means being operative each time said processing means is switched from said native mode to said emulation mode to reference said predetermined one of said sequences for generating signals for again loading said option mask register means with another set of signals representative of the process control block option mask word stored in a different one of said process control blocks coded for specifying said emulation mode, said emulation hardware means being conditioned by the contents of said option mask register means to execute concurrently target system programs specified by said different ones of said process control blocks for models including those options specified by the coding of said option mask word without requiring modification of said emulation means.

22. The system of claim 21 wherein said op code decode means includes:

decode means being operative in response to said op code to generate signals indicating the type of operation to be performed; and wherein said control logic circuit means includes a plurality of logic circuit means, different ones of said circuit means being coupled to said decode means for receiving said signals and to different ones of said bit positions of said option mask register means, each said different one of said logic circuit means being enabled by said control register means for executing the type of operation specified by said signals generated by different ones of said instructions of said target system program only when the bit positions associated therewith are in a predetermined state indicative of the inclusion of said option within said one of said models associated with said target system program being run under the control of one of said process control blocks.

23. The system according to claim 22 wherein said emulation hardware means includes means includes means coupled to said different ones of said circuit means, said means being conditioned by said circuit means to generate event control signals indicating attempts to process types of instructions inhibited by the coding of different ones of said option mask bits.

24. The system of claim 23 wherein different ones of said emulation sequences include microinstructions for generating signals for testing the state of another ones of said option mask bits of said multibit register means for conditioning said microprogrammed control means to execute native microinstruction sequences for processing said event control signals in place of other emulation microinstruction sequences for increasing system efficiency in processing said event signals generated in response to said types of target system instructions of programs specified by different ones of said process control blocks.

25. A multiprogrammed data processing system including a memory having a plurality of segments, one segment for storing instructions for at least one program, some instructions including at least an operand address portion and each instruction including an op code and a number of other segments storing a plurality of process control blocks, one for each process being run in said system, each of said blocks including control information for defining the state of a process at any given instant of time, processing means for executing said instructions and microprogrammed control means for generating control signals in response to said instructions, said control means being coupled to said memory and to said processing means, said control means including a plurality of sequences of microinstructions for generating said control signals for conditioning said processing means for execution of the operations specified by said instructions, said system further comprising:

a control information option mask word included in each of said control information words, said option mask word having a plurality of bits, different ones of said bits being coded to designate the presence of different options includable within different models of a series of target systems whose programs are required to be executed by said processing means when operated under the control of a process control block;

said processing means being coupled to receive instructions of said program from said one segment, said processing means including:

a plurality of register means for storing information required for processing instructions associated with the running of a process specified by any one of said process control blocks, said plurality of register means including a multibit position register means for receiving signals representative of said option mask word;

data manipulation means for manipulating operands specified for processing by said operand address portions of said instructions to perform those operations specified by the opcodes of said different ones of said instructions op code decode means for decoding the op code of said each instruction; and, control logic means selectively coupling different bit positions of said position register means to said data manipulation means and to said op code decode means, said processing means being conditioned by said control logic means for executing instructions of said programs written for execution by any one of said different models having a particular combination of said different options; and, a predetermined one of said plurality of sequences including microinstructions for generating said control signals for loading said option mask register means and different ones of said plurality of register means preliminary to executing instructions of a process specified by any one of said process control blocks, said microprogrammed control means being operative each time said processing means is conditioned for running a process to reference said predetermined one of said sequences for generating said control signals for again loading said option mask register means with signals representative of a process control block option mask word stored in another one of said process control blocks thereby enabling said processing means without modification to execute concurrently programs specified by different ones of said process control blocks for models having those options specified by the coding of said option mask word stored in said different ones of said process control blocks.

26. A method for facilitating the emulation of a number of different system models during the execution of instructions of a number of target system programs by concurrently executing a number of processes in a data processing system, said system including a memory having a plurality of segments, a first segment for storing instructions for at least one target system program, some instructions including at least an operand address portion and each instruction including an op code portion, and other segments for storing groups of control information words, each group corresponding to a process block for defining the status of a process at any given instant of time, processing means for performing the operations defined by the op code portions of said instructions and microprogrammed control means for generating control signals in response to said instructions, said control means being coupled to said processing means and to said memory, said control means including a plurality of sequences of microinstructions including microinstructions for generating signals for conditioning said processing means for operating in a native mode and in an emulation mode, said method comprising the steps of:

storing in each of said process control blocks, an option mask word having a plurality of bits, different ones of said bits being coded for defining which ones of a number of different options includable within said number of different system models comprising a series of target systems whose programs are required to be executed by said processing means are specified by said each of said process control blocks coded to operate in said emulation mode;

including in said processing means, a multibit position option mask register for storing signals representative of said option mask word and a plurality of logic circuit means for enabling said processing means for performing said operations;

connecting said plurality of logic means to different ones of said bit positions of said option mask register;

storing in said microprogrammed control means a predetermined sequence coded to include microinstructions for generating a sequence of control signals for transferring signals representative of said option mask word and signals representative of said other control words of said one of said process control blocks to said processing means; and, conditioning said microprogrammed control means to reference said predetermined sequence each time said processing means is switched from said native mode to said emulation mode for generating said sequence of control signals for loading said option mask register with signals representative of said option mask word stored in another one of said process control blocks of the process to be run, said plurality of control logic means being conditioned by said optional mask word signals to enable said processing means without hardware modification to to execute concurrently instructions of target system programs specified by different ones of said process control blocks in the same manner as any one of said models having those options defined by the coding of different ones of said option mask words.

* * * * *